United States Patent [19]

Bodenstein

[11] Patent Number: 4,752,401

[45] Date of Patent: Jun. 21, 1988

[54] WATER TREATMENT SYSTEM FOR SWIMMING POOLS AND POTABLE WATER

[75] Inventor: Willem J. Bodenstein, Ft. Myers, Fla.

[73] Assignee: Safe Water Systems International, Inc., Fort Myers, Fla.

[21] Appl. No.: 19,268

[22] Filed: Feb. 26, 1987

Related U.S. Application Data

[63] Continuation-in-part of Ser. No. 831,772, Feb. 20, 1986, abandoned, which is a continuation-in-part of Ser. No. 650,217, Sep. 13, 1984, abandoned.

[51] Int. Cl.$^4$ .................................................. C02F 1/32
[52] U.S. Cl. ..................................... 210/746; 204/150; 204/152; 204/197; 210/748; 210/760; 210/764; 210/96.1; 210/169; 210/192; 250/436; 422/24; 422/29; 134/1
[58] Field of Search ............... 204/148, 150, 152, 197, 204/302; 210/739, 746, 748, 764, 694, 760, 85, 96.1, 192, 198.1, 199, 205, 169; 422/24, 29; 250/435, 436; 134/1

[56] References Cited

U.S. PATENT DOCUMENTS

| | | | |
|---|---|---|---|
| 3,672,823 | 6/1972 | Boucher | 422/24 |
| 3,835,015 | 9/1974 | Gary | 204/197 |
| 3,974,071 | 8/1976 | Dunn et al. | 204/148 |
| 4,028,246 | 6/1977 | Lund et al. | 210/151 |
| 4,042,509 | 8/1977 | Bowen | 210/192 |
| 4,069,153 | 1/1978 | Gunther | 210/764 |
| 4,224,154 | 9/1980 | Steininger | 210/96.1 |
| 4,230,571 | 10/1980 | Dadd | 210/764 |
| 4,255,663 | 3/1981 | Lewis | 422/24 |
| 4,273,660 | 6/1981 | Beitzel | 210/764 |
| 4,372,860 | 2/1983 | Kaas | 210/748 |
| 4,400,270 | 8/1983 | Hillman | 210/748 |
| 4,416,854 | 11/1983 | Nielsen | 210/764 |
| 4,482,809 | 11/1984 | Maarschalkerweerd | 422/24 |
| 4,492,618 | 1/1985 | Eder | 210/764 |
| 4,548,716 | 10/1985 | Boeve | 210/760 |

Primary Examiner—Peter Hruskoci
Attorney, Agent, or Firm—Biebel, French & Nauman

[57] ABSTRACT

A method and apparatus are disclosed for treating water, either potable water or a recirculated body of water, in which the water flows through a passage around and in direct contact with the surface of the germicidal ultraviolet lamp and in direct contact with at least one ozone producing ultraviolet lamp, whereby dissolved oxygen in the water is directly converted into ozone dispersed in said flowing water. The water, when part of a recirculated flow as in treatment of pool or spa water, also flows in contact with a predominantly copper element having an extended surface, whereby ions of the copper are taken up in the water. The copper element preferably is a pair of spaced apart copper electrodes across which is applied an electrical potential by a control which maintains a constant current and thus regulates release of copper ions into the water for inhibiting growth of algae. The UV lamps are subjected to ultrasonic energy which will loosen particles tending to cling deposit on the lamp surface. The UV lamps are also driven at a high potential, at least 300 V, to minimize the effect of water cooling the lamps and reducing their UV output. Also, the UV lamps may be driven directly from a pulsed high voltage DC, thus avoiding need for a ballast transformer and also creating a positive charge on the lamp surfaces which will tend to repel positively charged particles otherwise tending to deposit on the lamps. Special UV resistant seals mount the lamps to a treatment chamber in such a way that the lamps can readily be removed for servicing or replacement.

17 Claims, 9 Drawing Sheets

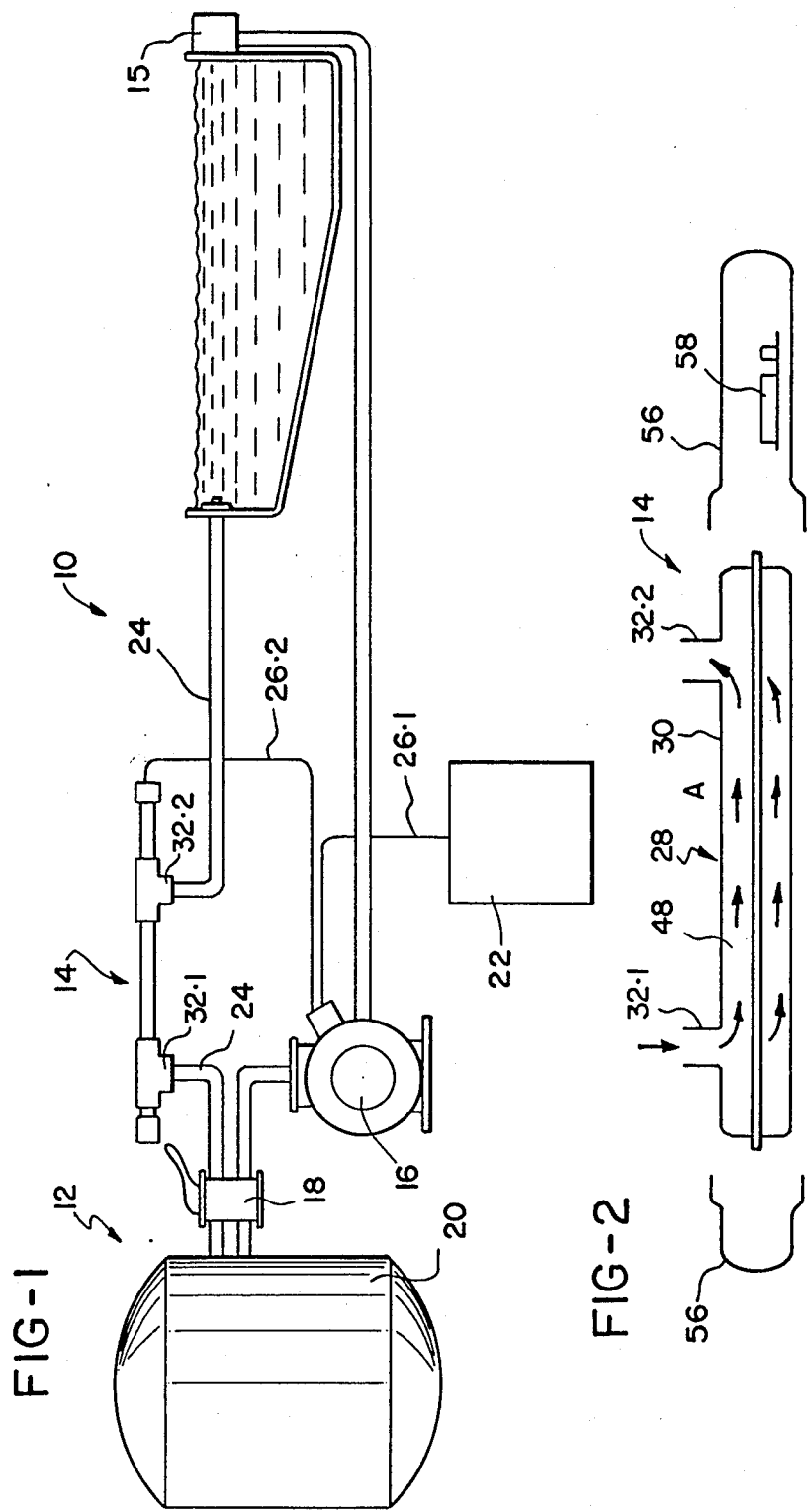

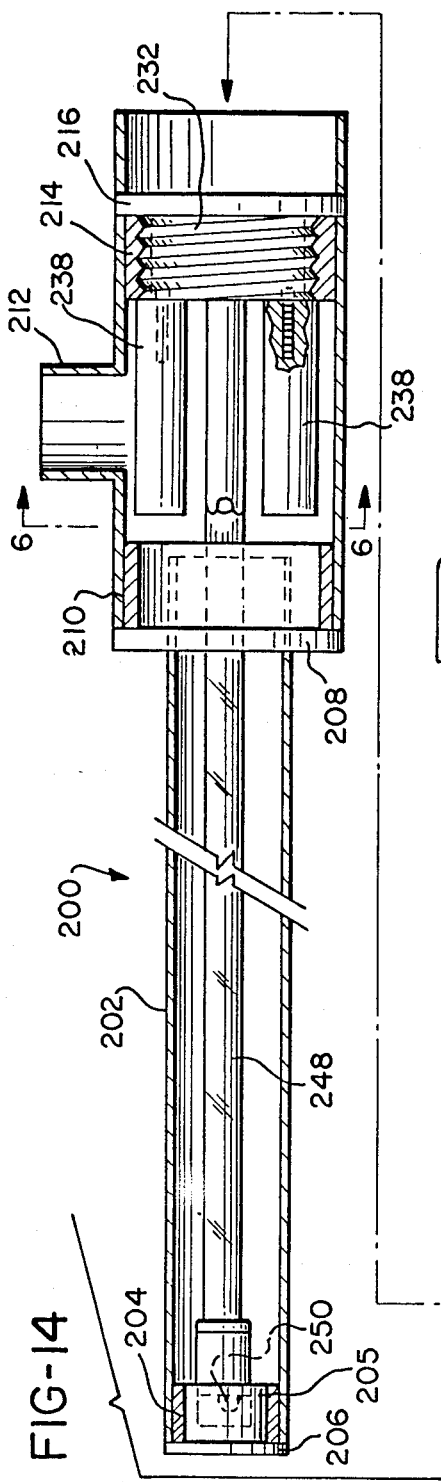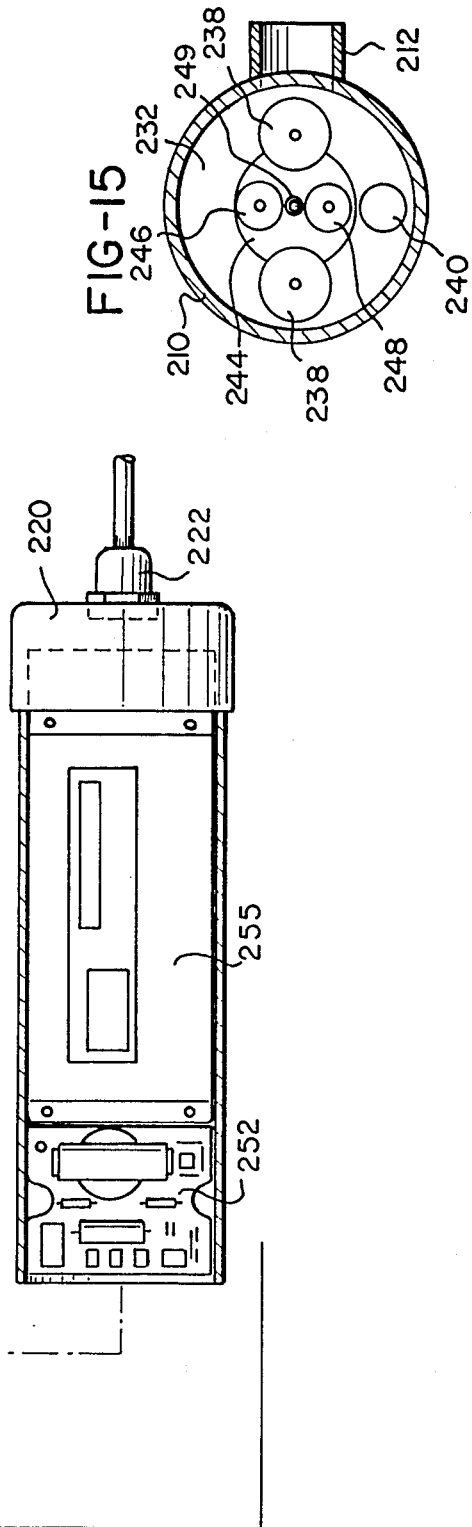

WATER TREATMENT SYSTEM FOR SWIMMING POOLS AND POTABLE WATER

CROSS-REFERENCE TO RELATED APPLICATIONS

This application is a continuation-in-part of copending U.S. application Ser. No. 831,772, filed Feb. 20, 1986, now abandoned, which is in turn a continuation-in-part of abandoned U.S. application Ser. No. 650,217 filed Sept. 13, 1984.

BACKGROUND OF THE INVENTION

This invention relates to methods and apparatus for treating large flows of recirculated water (e.g. 30 to 60 gallons/min.), such as swimming pool or spa water to eliminate the need for chemical treatment. A further aspect of this invention relates to purification of potable water at the same rates (e.g. 30 to 60 gallons/min.), as are associated with the water supply from a well or city, county municipal to a residential or commercial building.

The use of germicidal ultraviolet tubes in treating swimming pool water has been proposed, and is described for example in Dadd U.S. Pat. No. 4,230,571, issued Oct. 28, 1980 and Kaas U.S. Pat. No. 4,372,860, issued Feb. 8, 1983, and similar devices for treatment of potable water are described in Beitzel U.S. Pat. No. 4,273,660, issued June 16, 1981 and Lewis U.S. Pat. No. 4,255,663, issued Mar. 10, 1981.

In these earlier proposals, an ultraviolet tube was inserted into a quartz tube or some other surrounding housing, the water to be treated flowing through a flow passage on the outside of the quartz tube. The Lewis patent discusses using bactericidal UV irradiation at 253.7 nm. and ozone creating irradiation at about 188 nm., and recognizes that elimination of a quartz jacket or sheath will eliminate some problems associated with such a sheath, but may, by heat transfer from cold water, lower the operating temperature of the UV tube below optimum. Lewis thus discloses a solution to the problem as thus viewed, by providing a double wall tube incorporated in a disposable UV irradiating unit. In Beitzel U.S. Pat. No. 4,273,660, a flow of air is introduced between the tube and such housing to cause production of ozone which is then directed into the flow of water.

In either case, the ultraviolet tube was thus separated from direct contact with the water flow, which inevitably attenuates the effective irradiation of the water. When gaseous ozone is injected by venturi or otherwise into a flow of water, the tendency is for the ozone to "bubble out" of the water, not mix into the water, thus making it difficult if not impossible to maintain any residual ozone in the water. Thus, although this type of treatment will provide a certain degree of purification, supplemental chlorination of the water may still be required due to erratic irradiation or ineffectiveness in mixing sufficient quantities of ozone into the water. This makes these methods unattractive as an alternative to chlorination, particularly where there is a need to treat a substantial flow of water, as is associated with a water supply from a well to a residence or small business, or with a pool, spa, or cooling tower where the substantial quantity of water is recirculated.

U.S. Pat. No. 4,069,153 issued Jan. 17, 1978 to Gunther describes a system of providing a continuously available source of "physiologically safe" water, for use in fluid therapy, using an ultra-violet light emitting lamp with a special quartz shield, whereby UV light is radiated into a flow of water in the range of 180 to 200 nm. to convert dissolved oxygen into ozone; all of the water is required to flow within 6 mm. of the lamp surface. This, of course, greatly reduces the flow capacity of such a system, to the point where it is impractical for treating large flows such as mentioned above.

There is an observed tendency for the surface of a UV lamp and quartz sheath, which is exposed directly to water being treated, to become coated with a scum-like layer of deposits, such as calcium related particles, which will tend to build up to the point that there is intererence with the transmission of ultraviolet light into the surrounding water. Also, such UV lamps are designed to operate at about 80° F., and exposure of the lamp while operating to lower water temperatures will cool the lamp and reduce the amount of ultraviolet light emission from the lamp. Thus, a successful and acceptable system utilizing UV water treatment must include provisions for quick and easy maintenance of the UV lamps, such as cleaning their surfaces as needed, or otherwise reducing the deposits remaining on those surfaces, and must also compensate for the tendency to reduced UV emission with lowering of lamp operating temperature.

Also, such prior art arrangements and methods do not provide sufficient control over the growth of algae in the pools, and it is well known that suppression of algae growth, particularly on pool walls, and especially in warm climates with substantial sunshine, represents a further difficult control problem. This is particularly true of owners of private pools or spas who are unskilled in (and do not wish to be bothered by) the chemical regulation techniques necessary to maintain clear algae free, very low bacteria content water in their pools.

U.S. Pat. No. 4,492,618 issued Jan. 8, 1985 to Eder, discloses a method of disinfecting pool water using sacrificial copper-silver (Cu-Ag) alloy electrodes connected to a polarity reversible power source, but that method also requires the addition of quantities of sodium persulfate into the water, and does not recognize the advantages of using ozone to purify the water.

Accordingly, there is a need for a device and a method of treating a substantial flow of water, making use of one or more ultraviolet tubes or lamps, for direct bactericidal irradiation treatment and for converting dissolved oxygen in the water into substantial amounts of ozone which result in residual ozone treatment of the water for some hours when the purification device is switching off. Such a device and method must include provisions for easy UV lamp maintenance, an extended period of time between necessary cleaning and maintenance, and compensation for the tendency to reduced UV output from the lamps when operating temperatures may decrease below optimum. This need exists in purifying potable water and, when combined with a regulated source of copper ions, to eliminate the need for supplementary chlorination or other chemical treatment in large recirculating flows of water such as in swimming pools and spas.

SUMMARY OF THE INVENTION

The preferred embodiment of present invention provides an apparatus and method for the purification of a substantial flow of water, either potable water or recirculated water as in swimming pools and spas, in which one or more ultraviolet radiation sources irradiate water flowing in direct contact therewith at wavelengths which are bactericidal and which also convert dissolved oxygen in the water into ozone, thereby combining the immediate bactericidal effect and the residual oxidizing effect of ozone in a single easily maintained unit which does not need chemical additives to accomplish purification. UV germicidal or bactericidal irradiation and simultaneous conversion by radiation of dissolved oxygen into ozone thus are combined; ongoing bactericidal and oxidizing effects of ozone are achieved; and there is also a catalytic effect of UV irradiation on the reaction of the ozone with bacteria, viruses and other undesirable compounds in the water, thus accelerating oxidation of contaminants.

The invention also provides ways to facilitate cleaning of the surfaces of the UV lamps, and/or to reduce deposits thereon, and thus both to simplify and reduce the frequency of maintenance to the unit. Improved mounting seals are provided which allow removal and cleaning of the UV lamps (tubes) by unskilled persons, with minimal tools. Also, provisions are made for creating ultrasonic energy into the water surrounding the lamps, for example at system startup or when UV radiation output falls below predetermined levels, to loosen deposits from the lamp surfaces whereby such deposits may be entrained in the water flow and removed at a filter. In addition, provisions are made for driving the lamps with a high voltage (e.g. 300 V. DC) pulsed supply, and in addition to providing higher operating temperatures, and allowing deletion of the usual electrical ballast transformer, this creates a positive charge on the outer lamp surface which tends to repel particles having a positive charge which might otherwise deposit on the lamp.

When utilized to purify swimming pool and spa water, the unit also includes a controlled copper ion source effective to control algae growth in such water and surfaces (such as pool walls) which the water contacts, without discoloration and staining which often accompanies uncontrolled addition of such ions.

It has been observed that irradiation of water under these conditions also results in flocculation of particles contained in the water flow; this is also an effect of ionization, i.e. introduction of copper ions into the water. Since systems to which the invention pertains will, as a general rule, include a filter in the flow circuit with the purifying apparatus, an additional advantage is derived from the flocculation since such filter will remove smaller particles which are flocculated into larger particles, the larger particulate thereby allowing their removal from the water flow. This results in dramatically improved clarity of the water.

In the most basic embodiment of the present invention, a device for treating a substantial flow of water is provided which consists of one or more ultraviolet lamps (tubes) for producing bactericidal UV radiation, for example in the 253.7 nm. wavelength range, and UV radiation in the order of 180 nm. to convert dissolved oxygen into ozone. The tubular lamps have an electrical terminal at each end thereof. A casing or housing, of stainless steel or some suitable corrosion resisitant plastic material, surrounds the lamps with the terminal projecting outward of the casing and secured by any easliy removed water-tight seal. The casing and the lamp or lamps together define a flow path of generally annular cross-section for water flow and the casing has an inlet opening leading into the flow passage and an outlet opening leading from the flow passage, at or near opposite ends of the lamp.

The flow passage is of sufficient cross-section that water flow of substantial amount, for example at least 30 gallons/min., will be accomodated at pressures in the order of 30 to 80 psig. The water flow is in direct contact with the outer surface of the UV lamp or lamps.

In the case of the device being used to treat recirculated water for swimming pools or spas, in addition a controlled source of copper ions is provided. A simple form of such ions may be a predominantly copper sacrificial element or electrode of predetermined size, shape, and surface area, such as a coil of copper wire, to release copper ions at a predetermined rate which may be related to the flow rate of the water and its exposure to such element. Preferably, however, a pair of copper electrodes are supported in the water flow and subjected to a predetermined and reversible D.C. potential, and a constant current controller is provided which regulates this potential to avoid over-ionization of the water. The preferred concentration of copper ions is about 0.20 parts per million (ppm.), and experience has shown this should not exceed about 0.50 ppm.

Various configurations of casing or housing are possible, including a compartment at one end of the casing for containing the electronics to drive the UV lamp or lamps, and for driving and controlling the electrodes. The ionizing apparatus may be a separate device connected in the water flow circuit with the casing and flow passage. In all configurations, there are easily released seals of special UV resistant materials and construction which permit removal and servicing and/or replacement of the UV lamps, and the driving circuit for the lamp(s) is specially constructed to drive the lamps at a high enough electrical potential (voltage) to compensate for any reduction in UV output due to cooling of the lamps by the water flow.

In another embodiment, at least one ultraviolet lamp emitting at approximately 253.7 nm. and one ozone producing ultraviolet lamp emitting at approximately 180 nm. are housed in separate interconnected cylinders. When this embodiment is utilized for the purification of swimming pool or spa water, a pair of copper electrodes is positioned at one end in one of the two cylinders.

The principal object of the present invention, therefore, is to provide a device for purifying a substantial flow of water, such as the potable water supply in a residence, or larger building requiring up to 60 GPM flow, or the recirculated water of a swimming pool or spa, by utilizing bactericidal UV irradiation, for example at about 253 nm., together with UV irradiation at about 180 nm. which causes dissolved oxygen in the water flow to convert into entrained, residual ozone have an immediate and also ongoing oxidizing effect on impurities in the water; in the case of pool or spa water, to provide a controlled source of copper ions which will regulate copper ion concentration in the water, preferably to about 0.20 ppm., and thereby to eliminate algae from the water and its containing walls without need for supplemental chlorination or other chemical additives; to provide means for loosening particulate material tending to deposit on the UV lamp surfaces, and thus to extend the between-service time of the operating unit; to provide a unique higher voltage pulsed DC driving circuit for the UV lamps which eliminates some costly and service-prone components and which tends to raise the operating temperature of the UV lamps to a more efficient range; and to create a positive charge on the outer surfaces of the UV lamps, which tends to inhibit the deposit of some particles thereon, thus improving the servicability of the units.

Other objects and advantages of the invention will be apparent from the following description, the accompanying drawings and the appended claims.

BRIEF DESCRIPTION OF THE DRAWINGS

FIG. 1 diagrammatically shows a swimming pool installation which includes a filtration unit and an ultraviolet irradiating device for treating the swimming pool water in accordance with the invention;

FIG. 2 is a diagrammatic, exploded longitudinal section of the ultraviolet irradiating device;

FIG. 14 is a sectional view of another embodiment of the present invention showing internal parts in elevation, and some parts partly broken away and in section;

FIG. 15 is a cross-sectional view taken along the line 15—15 of FIG. 14; and

DETAILED DESCRIPTION OF FIRST EMBODIMENT

Figure 4:
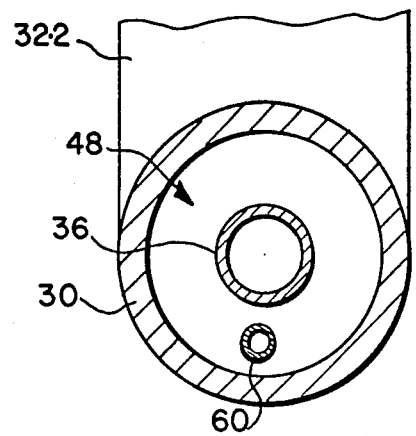
FIG. 4 is a cross-section of the ultraviolet irradiating device on line 4—4 in FIG. 3.

FIGS. 1-4 show the embodiment of the invention disclosed in original application Ser. No. 650,217 (now abandoned). A swimming pool 10 is connected in a recirculating system which includes a filtration unit 12 and an ultraviolet irradiating device 14, for treating the swimming pool water. The recirculating water path includes skimmer box 15, an electrically driven pump 16, a multi-port valve 18, a filter vessel 20 and an electrical terminal box 22. The ultraviolet irradiating device 14 is connected in return pipe line 24 leading from the multi-port valve 18 back to the swimming pool. Electrical connections 26.1 and 26.2 lead from the terminal box 22 to the pump 16 and from the pump 16 to the device 14 respectively. When the pump 16 is switched on, water flows from the skimmer box 15 to the pump 16, from where the water is pumped through the filter vessel 20 and the device 14 back into the swimming pool.

Figure 3:
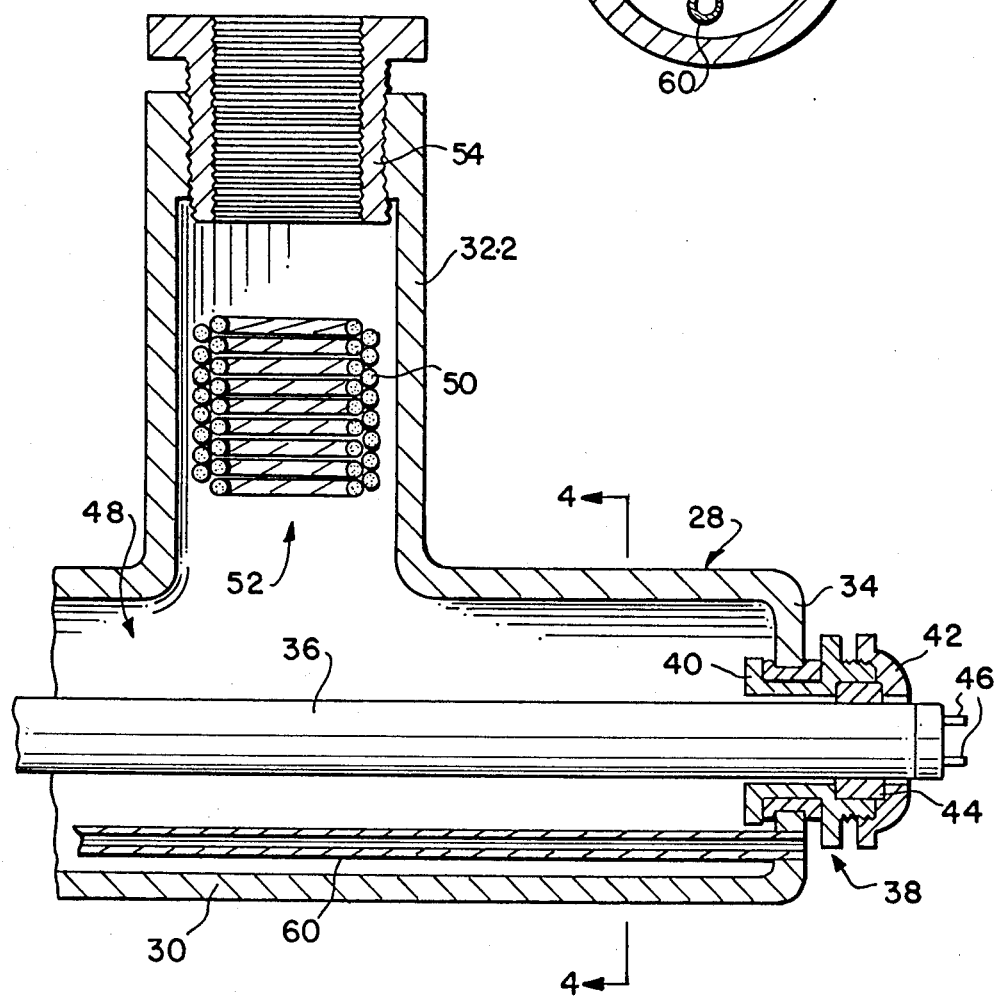
FIG. 3 is a detailed longitudinal section of one end of the ultraviolet irradiating device, which also illustrates a source of copper ions for the water.
Figure 5:
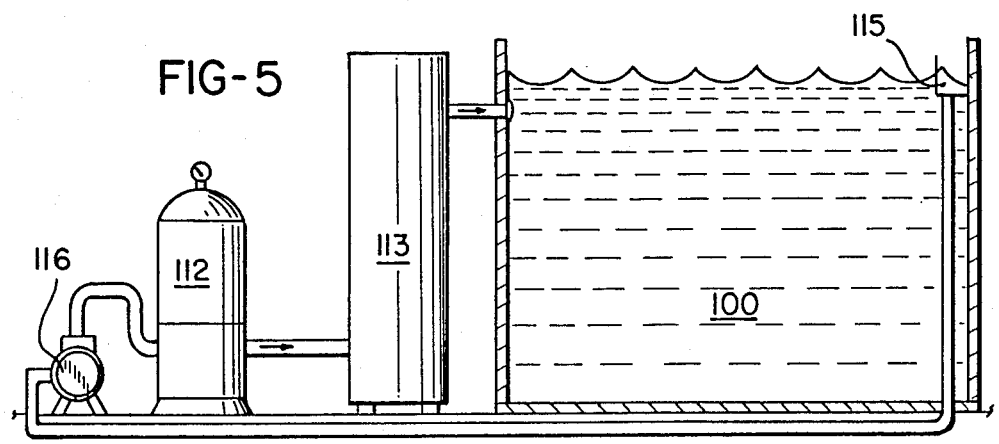
FIG. 5 is a diagrammatic view similar to FIG. 1, showing a preferred embodiment of the invention as connected to purify recirculated swimming pool water.

Referring to FIGS. 2-4, the device 14 comprises a casing 28 having a longitudinally extending cylindrical body portion 30, an inlet portion 32.1 extending transversely from the body portion at or near one end thereof, an outlet portion 32.2 extending transversely from the body portion at or near the other end thereof, and an end wall 34 at each end of the body portion. A tubular UV lamp 36 extends within the entire length of the body portion 30 and protrudes at each end thereof through the respective end walls 34. Where each end of the lamp protrudes through an end wall 34, there is a water-tight seal 38, the seal comprising a screw-threaded fitting 40 secured to the end wall 34, a theaded cap 42 which is screwed onto the fitting 40, and a sealing ring 44 between the fitting 40 and the cap 42. When the cap 42 is tightened onto the fitting 40, the sealing ring 44 is brought into sealing engagement with the surface of the lamp 36, whereas when the cap 42 is loosened, the lamp 36 can be withdrawn from the casing. At each end, the lamp 36 has a pair of terminal pins 46 which are outside the casing when the lamp is mounted.

The lamp 36 is of the low-pressure gas-discharge type adapted to produce radiation which lies predominantly in the ultraviolet region of the electromagnetic spectrum. The lamp has the construction similar to a conventional fluorescent tube, although it will be appreciated that it need not have a fluorescent coating. The lamp 36 and the body portion 30 define between them a flow passage 48 of generally annular cross-section (FIG. 4). It will be appreciated that the casing and the seal parts, which are exposed to radiation from the UV lamp, are of appropriate materials which will not degrade under prolonged UV irradiation.

Inside one or both of the inlet and outlet portions 32.1, 32.2 there is arranged a sacrificial copper element 50. The element 50 consists of a length of bare, heavy duty, multiple-stranded copper wire which has been wound up to fit into the portion 32.1, 32.2 and has a central opening 52 to facilitate the passage of water. Element 50 thus has a predetermined exposed surface area which is large compared to its volume. The element is retained in the inlet/out portion by a screw-in fitting 54.

At each end of the casing 28 there is a housing 56 (FIG. 2) which can be secured to the respective end of the casing and which provides a protective cover for the protruding ends of the lamp 36 and the terminal pins 46. One housing is longer than the other and in addition houses ballast and starter circuitry 58 for the lamp 36.

The casing 28 is further provided with a conduit 60 (FIGS. 3 and 4) which passes longitudinally through the flow passage 48 and extends at each opposite end in a water-tight manner through the respective end wall 34. The conduit provides a dry passage for electrical connections leading from one housing 56 to the other.

In use, water from the filter vessel 20 enters the inlet connection 32.1, flows around and through the respective copper element 50 through the flow passage 48, and into the outlet portion 32.2 where is flows around and through the other copper element 50 (if used) in that portion, then back to the swimming pool. The flow of water through the device is indicated by arrows A in FIG. 2. The copper elements 50 corrode in the water in accordance with the flow rate and thus have the effect of introducing a predetermined amount of copper ions into the water.

In flowing past and in direct contact with UV lamp 36 in the casing 28, water is irradiated by ultraviolet radiation. This maximizes the bactericidal effect of the radiation. The cross-section of the flow passage 48 should not be too small as it would then unduly impede the flow of water through the filtration unit. On the other hand, the cross-section should not be too large, as in that event some of the water flowing through the flow passage would flow too far from the lamp and would then not be properly irradiated.

A system with the following dimensions has been found to provide adequate treatment:
UV lamp: 80 cm. length
Inside diameter of casing: 55 mm.
Outside diameter of UV lamp: 25 mm.
The device 14 is connected to be energized whenever the pump 16 runs and the system has been found to provide adequate treatment for an average size domestic swimming pool when connected in the existing filtration plant of a pool, with the pump running for about 12 hours per day.

DETAILED DESCRIPTION OF PREFERRED EMBODIMENT

FIGS. 5-12 show the preferred embodiment of the invention in conjunction with a swimming pool 100. A water system for the pool includes the usual filter 112 and a housing or casing 113 which incorporates a UV irradiating device 114 shown in greater detail in FIGS. 7-9. The recirculating water path includes a skimmer 115, an electrically driven pump 116, the filter 112, and an ionization unit 118. An electrical control circuit panel 120, an electrical transformer XFMR1, and a ballast transformer XFMR2 also are contained within casing 113. The UV irradiating device 114 is connected at its inlet to the output of the filter, and at its outlet to the ionization unit 118, which in turn is connected to the return line 124 leading back to the pool.

The casing 113 is typically about 12 inches (30.5 cm.) wide, 10 inches (25.4 cm.) deep and 42 inches (107 cm.) high, with removable top and front covers 113A and 113B. A relatively rigid back plate 125 in the back of the outer casing accommodates and supports a number of the aforementioned individual components, as can be seen from FIG. 6.

Irradiating Chamber

Figure 6:
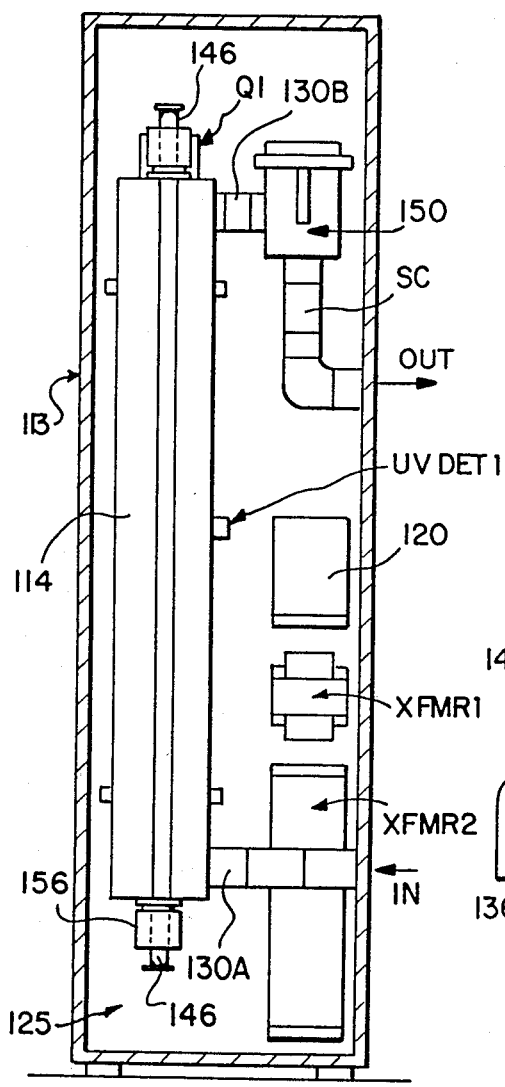
FIG. 6 is a front elevation view of the preferred embodiment of a purifier unit according to the invention, with the outer casing in section to show details of the water irradiating unit, and also showing schematically an ionization unit connected in series with the irradiating unit, with a general showing of elements of the power supply of electronics package.
Figure 8:
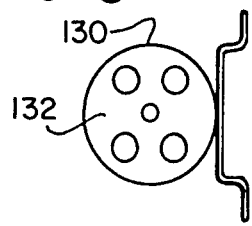
FIG. 8 is a top end view of the irradiating unit.
Figure 7:
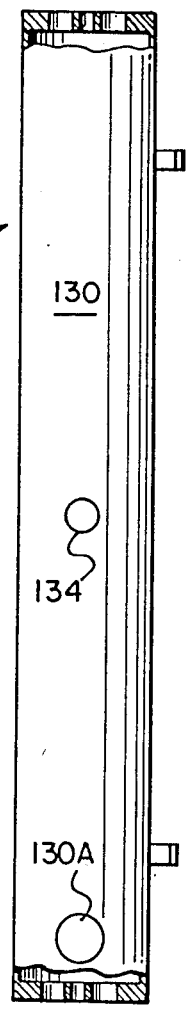
FIG. 7 is a vertical cross-sectional view of the irradiating unit.
Figure 9:
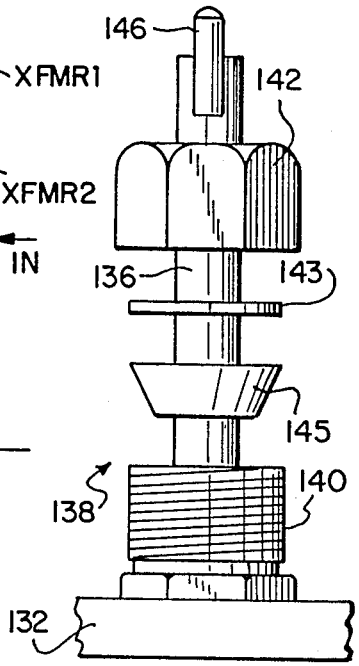
FIG. 9 is an enlarged view of one end plate of the unit shown in FIG. 8, with as exploded representation of one of the seals used in supporting the UV lamps.

Referring to FIGS. 6-9, a water irradiating chamber 130, made of UV resistant material, preferably stainless steel, and measuring about 29 inches (73.66 cm.) high and 4 inches (10.16 cm.) in diameter, is mounted on back plate 125 in a vertical position with a water inlet 130A at the right bottom and water outlet 130B at the right top. Referring to FIG. 7, chamber 130 further has end plates 132 welded to its top and bottom, each with four threaded holes to accommodate water tight polyvinylidine floride (or similar UV resistant) seals (refer to FIG. 9) to support and seal up to four germicidal and ozone producing ultraviolet lamps (UV) in the chamber 130. A fifth threaded hole 133 in the center of the end plates 132 provides a means to mount a ultrasonic transducer (described later) into the water chamber to facilitate cleaning the surfaces of the UV lamps. A threaded hole 134 is provided on the right hand side at the center of chamber 130 to receive an ultraviolet light sensor to detect ultraviolet light output intensity from the UV lamps.

One or more tubular UV lamps 136 extend within the entire length of chamber 130 and protrude through the respective end plates 132, being supported there by a water-tight seal 138. Each seal comprises a screw-threaded fitting 140 (FIG. 9) secured to the end wall 132, a theaded cap or compression nut 142 which is screwed onto the fitting 140, a compression washer 143, and a compression gland 145 of a UV resistant material such as polyvinylidene fluoride which will tightly clamp against the exterior of the lamp tube and the fitting 140 when the cap 142 is hand-tightened. When the cap 142 is loosened, by hand, the gland will relax sufficiently that the lamp 136 can be withdrawn from the casing. Thus, removal of the lamps for cleaning their tubular surfaces is a simple task that can usually be performed without special tools, as by a domestic pool owner.

At each end, lamp 136 has a pair of terminal pins 46 (or similar electrical connector or contact) which are outside the casing when the lamp is mounted.

Commercially available ultraviolet lamps are utilized with the preferred embodiment of the present invention for both swimming pool and spa water purification and for potable water purification. These are available from North American Philips Lighting. A germicidal ultraviolet tube Model No. 782L-30, produces ultraviolet radiation at approximately 253.7 nm. The lamp which has been found effective to produce ozone in the present invention is Model No. G37T6VH, which emits ultraviolet light at approximately 180 nm and at 253.7 nm. Preferably, at least one of each type (or equivalent) lamp is used.

In use, water from the filter 112 enters the inlet connection 130A, flows through the flow passage 148 which is defined by the interior wall of chamber 130 and the exterior surfaces of the tubular lamps 136, and through the outlet 130B to an ionization unit, later described, used for treatment of recirculated water as in pools or spas.

As noted, the interior diameter of chamber 130 is about 4 inches (10.16 cm.), and there is about a two foot length (61 cm.) from inlet 130A to outlet 130B. Each lamp tube is about ½ inch (1.27 cm.) in diameter. There is sufficient space within the body of the casing and provisions are made in the end plates 132 to add at least two more lamps if such additional irradiating power should be needed. Water flowing past and in direct contact with the UV lamps 136 is subjected to bactericidal UV radiation and also to UV radiation at about 180 nm. which will convert dissolved oxygen in the water directly into ozone, thereby assuring that such ozone remains dissolved and has a substantial residual effect. Actual tests have indicated the presence of residual ozone in water treated by this unit at least 12 hours after the lamps have been deenergised. The flow passage, constructed as described, will accomodate a substantial flow of water, in the order of 60 gallons/min. (227 liters/min).

Ionization Unit

In this preferred embodiment, when used to treat pool or spa water, an ionization unit 118 is mounted to the outlet 130B (see FIG. 6) and has a separate housing which contains spaced copper electrodes 152 to supply a controlled amount of copper ions for algae suppression.

This arrangement has the advantage of allowing more space for larger electrodes, if the installation requires them, and also separates the UV radiation/ozone treatment function and apparatus from the ionization function of adding appropriate amounts of copper ions to the water for inhibiting algae growth. This in turn allows the use of less expensive materials for the housing 150 and its flow connections, since these are not subjected to the UV irradation.

Figure 13:
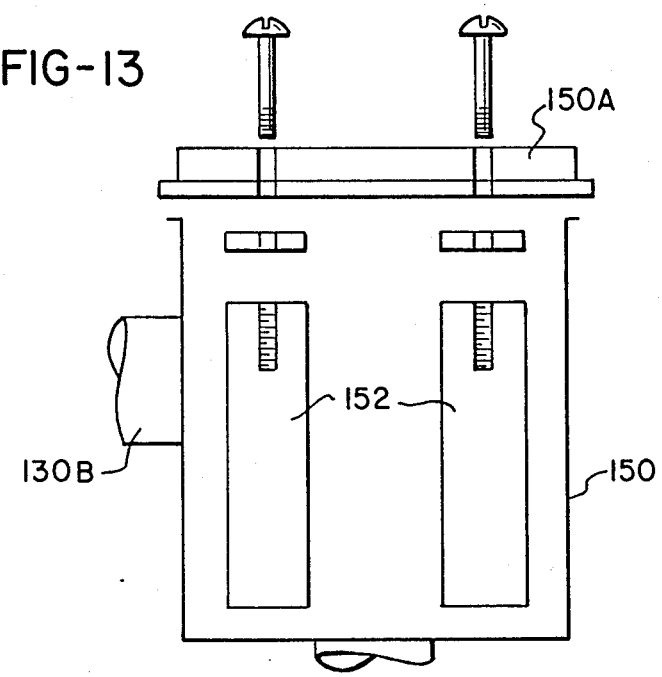
FIG. 13 is an exploded view of a copper electrode ionization unit.

Referring to FIGS. 6 and 13, an ionizer housing 150 is mounted to the top water outlet 130B of chamber 130., Housing 150 has a removable top 150A to which two copper electrodes 152. In a successful embodiment, these electrodes measure 4 inches (10.16 cm.) in length and 1 inch (2.54 cm.) in diameter and are mounted in the lid with stainless steel screws (not shown), with a rubber seal between the lid and electrode to make the mounting water tight.

Water flows into the side of the ionizer housing and out the bottom. To the bottom water inlet of the water chamber a water flow sensing unit is fitted, which contains two electrical coils to sense water flow through the system.

Electrical Components

Figure 10:
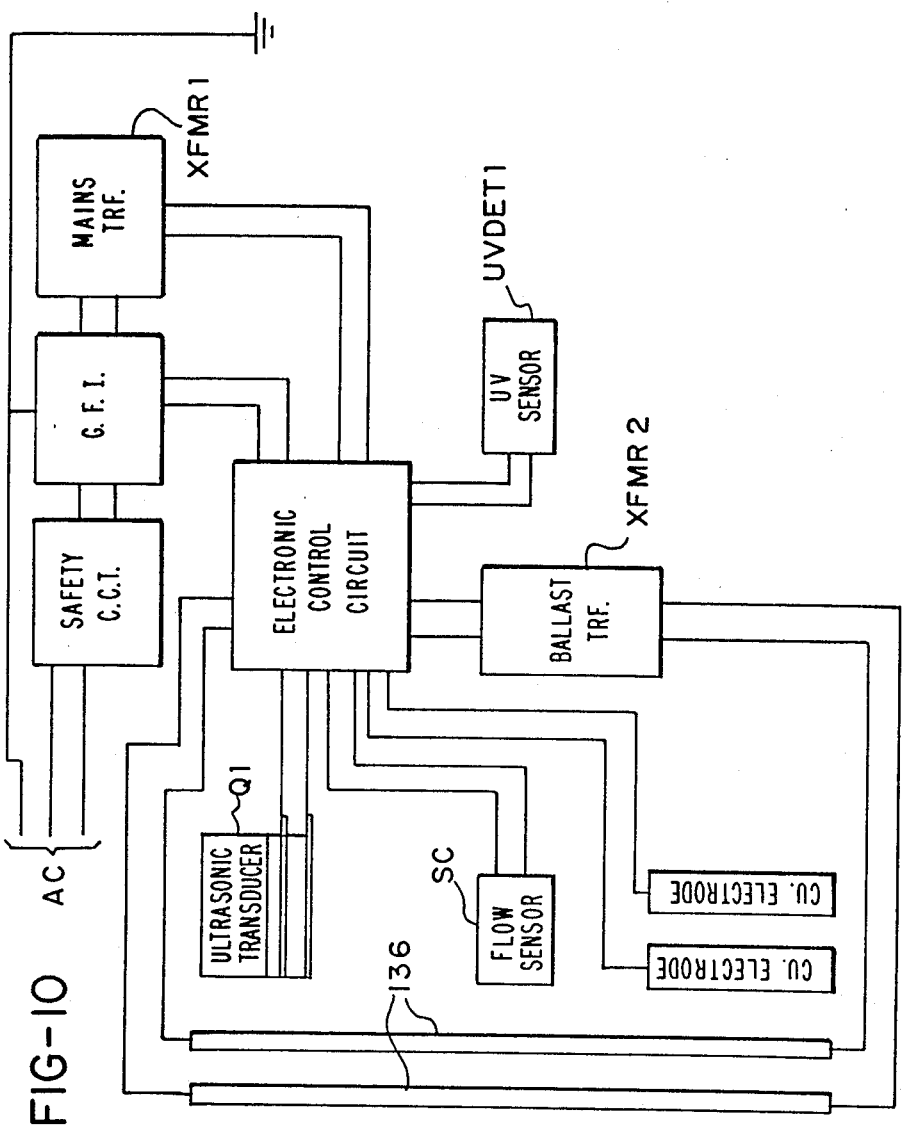
FIG. 10 is a block diagram of the electrical circuit for the system shown in FIG. 5.

Referring to FIGS. 6 and 10, all the electrical components, namely the ballast and main transformers, electronic control card and safety circuits are mounted on the back plate 125 to the right of chamber 130 Electrical power is supplied from an available A.C. source (usually 110 V. A.C.) through the right side of outer housing via a strain relief connector (not shown) to the electrical circuitry mounted on the back plate, which also can function as a good electrical grounding plate for the system..

Figure 11:
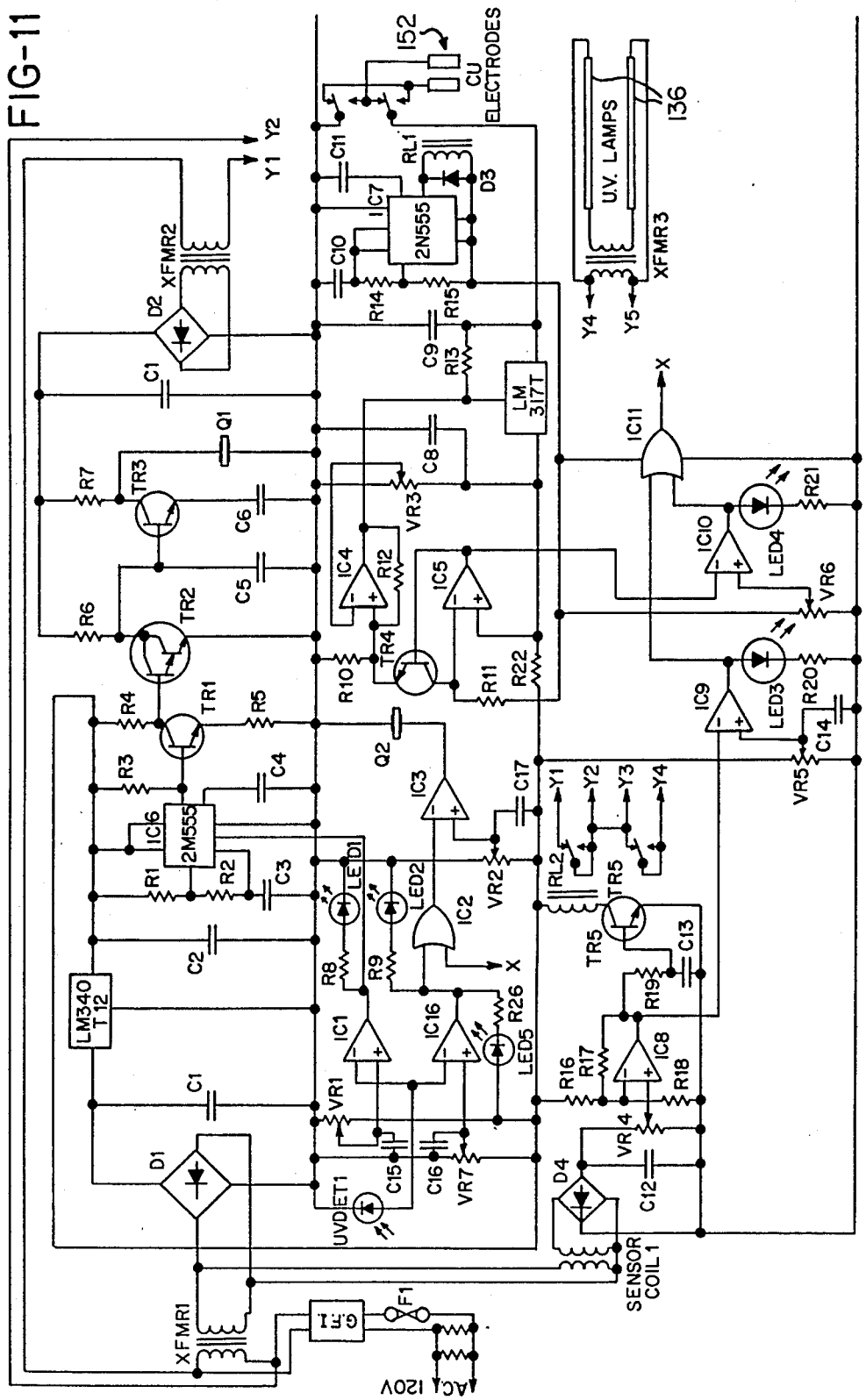
FIG. 11 is a diagram of the electronic circuit for driving the UV lamps and controlling the release of copper ions by the ionization unit.

Electrical and Electronic Circuit Operation Low Voltage Power Supply Circuit Referring to FIGS. 10 and 11, power is supplied to the unit via the safety circuit which contains a 400 volt surge suppressor, 10 kva spike suppressor and 3 amp fuse F1. A G.F.I. further provides a safety function by detecting possible ground currents, in which case it will disconnect the unit totally from the power source. From here power is fed to the main transformer XMFR1 which lowers the voltage from 110 volts to 12 volts. A.C. is then converted to D.C. by the fullwave bridge rectifier D1, and smoothed by capacitor C1. The voltage at that point is regulated to 12 volts by the voltage regulator LM340T12. Additional smoothing is provided by C2.

Water Flow Sensing and "On Time" Delay Switching Circuits

Twelve volts A.C. is also supplied to the primary winding of a water flow sensing coil SC (FIG. 11), which sets up a stationary magnetic flux in the secondary winding of that coil. The coil is mounted in the flow path beyond the ionization unit. The A.C. which is developed in the secondary winding is rectified by a fullwave bridge rectifier D4, smoothed by C12 and then applied across a variable resistor VR4. The voltage between the negative and positive inputs of IC8 is derived from R16 and R18, for the negative input and VR4, for the positive input. The differential voltage is adjusted between the two inputs to keep the output voltage on IC8 low with no water flow through the system by means of VR4. As soon as water flows through the unit, the magnetic flux between the primary and secondary windings in the flow sensor coil SC, increases, thus increasing the voltage on the positive input leg of IC8 and thus switching the output voltage on IC8 to high. The RC network provides a delay on time which is determined by R19 and C13. TR5 then switches RL2 to the on position, which in turn supplies power to the ballast and high voltage transformers XFMR2 and XFMR3, which energizes the ultraviolet lamps and ultrasonic amplifier, via contacts Y1, Y2 and Y3, Y4 respectively.

Flow Sensing and Alarm Systems

At "power up" the differential voltage between the two input pins of IC9, is high on the negative pin, due to the negative feedback resistor R17, and low on the positive pin, due to the charging time of C14, via VR5, thus holding the output of IC9 low for a preset time determined by the RC network, VR5 and C14. After the preset time the voltage on the output pin of IC9 will swing high, energizing the "no water flow" LED 3 and the audio alarm buzzer Q2 via the OR gates IC11, IC2 and OpAmp IC3, thus indicating no water flow through the purification system. If however, water flow is detected, the voltage on the negative pin of IC9 will swing high before the preset charging time of C14, thus, preventing an alarm condition. The differential input voltages on IC9 are preset by the R.C. network VR5 and C14 to determine the "alarm on" voltage level.

UV Output Detector and Alarm System

The intensity of UV emitted by lamps 136 in chamber 130 is measured by an ultraviolet sensor UVDET1. As the lamps age or dirt or particulate buildup increases on the lamp surfaces, UV output will decrease, thus the voltage output on UVDET1, will decrease. The differential voltage between the input pins on IC1 is determined by the output of UVDET1, on the negative input pin, and by a preset level determined by VR1 on the positive input pin. So, if the output voltage of the UVDET1, drops below the preset differential voltage level, the output on IC1 will swing high, activating the alarm system. At initial startup however, the output of IC1 is held low by the RC network VR1 and C15 for a preset time until C15 is charged. This is to prevent possible alarm conditions occurring unnecessarily. LED2 will indicate a "UV defective" condition and LED5 an "UV good" condition. If no UV is detected after the time delay elapsed, provided by the RC network VR7 and C16, the audio alarm Q2 will be energized via IC2 and IC3.

Ultrasonic Cleaning System

Referring to FIGS. 10 and 11, the preferred embodiment of the present invention includes an ultrasonic transducer Q1 (see output of TR3) mounted to chamber 130, driven by associated electronic circuitry mounted on the electronic control circuit card. The system is set to switch on every time a new purification cycle is started and/or when the UV output decreases to a preset level, which in turn is detected by UV sensor UVDET1, and its associated electronic circuitry. The output from UVDET1 is also fed to IC1. The differential voltage on the input pins of ICI is determined by the output of UVDET1, on the negative pin and by the preset level of VR2. If the output of UVDET1, drops below the threshold level, the output of IC1 will swing high, removing the reset condition of the oscillating circuit IC6, and thus driving the ultrasonic transducer Q1, via TR1, TR2 and TR3. The ultrasonic energy thus imparted into chamber 130 acts to loosen particulate matter deposited on the UV lamp surfaces, whereupon such material can be flushed off by the water flow and entrained for subsequent removal by the filter. This cycle will continue until the ultraviolet light intensity has increased sufficiently to increase the output from UVDET1 above the threshold level. The LED2 indicates a "cleaning cycle". At initial startup the output of IC1 is held low for the preset "on delay" time until C15 is charged via VR2; this is to prevent unnecessary switching of the ultrasonic system. The frequency of the oscillator IC6 is determined by R1, R2 and C3. C4 provides a controlled voltage to the oscillator. TR1 provides the low voltage preamplification stage to TR2. TR2 acts as a high voltage driver to TR3. C5 and C6 provides waveform correction and transistor biasing. A high rail voltage of +/−300 volts DC is provided by D2 and C7.

Ionizer and Alarm System

Referring to FIG. 11, to control the level of copper ions in the pool or spa water, power is supplied to the control and driving circuit by means of a conventional power transformer XFMR1 which drives a full wave bridge rectifier D1 to produce a D.C. potential which is filtered by a 470 uf/25 volt capacitor and then regulated to 12 volts by a regulator LM340.

A timer (2N555) functions as an oscillator connected to the regulator to produce a square wave. This electrical output at pin 3 is integrated and the resultant waveform is fed to pin 2 of the second timer (LM555CN) which functions as a pulse width modulator. The resultant output at pin 3 of the second timer is fed to a preamplifier TR2 through diode D1 and a 10K circuit limiting resistor, to drive the output transistor TR1 and the electrical output at the emitter of TR1 is fed through the switches S of a relay RLY1.

The pulse width modulator is controlled by a voltage received at pin 5, derived from an operational amplifier LM147CN. Feedback, which is proportional to the current flow between the electrodes submerged in the water flow to be ionized, is provided at pin 2 of the operational amplifier from a resistive network (470K, 100K). Because the content of bacteria and algae causes the resistance of the water being treated to vary, the current between the submerged electrodes between which this water flows will vary accordingly. This change or variance in current is sensed by the operational amplifier at pin 2 and thus controls the input at pin 5 of the pulse width modulator LM55CN-2 418.

A variable controlling point is established by a 10K potentiometer POT. The polarity of the electrodes is alternated about every five minutes by a timer LM555CN-3 connected as an oscillator, which in turn drives relay RLY1.

Controlled ionization is provided by a constant current circuit. R11 and R22 provides a differential voltage between the input pins on IC5. As the current fluctuates between the two electrodes because of different water conditions and electrode to water contact surfaces, the voltage across R22 will vary, switching the output of IC5 up and down, in turn switching TR4 and subsequently IC4 which controls the voltage regulator LM317T and thus varying the voltage on the electrodes to maintain a constant current and therefore providing a controlled copper ion dispersion rate into the water. As soon as the preset current level determined by VR3 cannot be reached, the output on IC5 will swing high attempting to correct the situation, if at this time, because of excessive wear on the electrodes, the condition cannot be corrected, the output on IC10 will swing high, energizing LED4 "REPLACE ELECTRODES", and Q2 (Audio Alarm) via IC11, IC2 and IC3. IC7 with C10, R14 and R15, representing an oscillator, provides electrode polarity switching through RL1.

Electronic Ultraviolet Lamp Drive

Much of the circuit in FIG. 11 has already been described. When the UV lamps are energized, the high voltage transformer XFMR2 applies a pulsed DC to the lamp ballast transformer XFMR3. The ballast transformer is of a selected type which will drive or power the lamps with a higher voltage (about 800 Volts) D.C. supply which assures the lamps are operating a peak performance, even when they might be cooled by flow of cooler (e.g. 80° F. or lower) water over the lamp surfaces.

Figure 12:
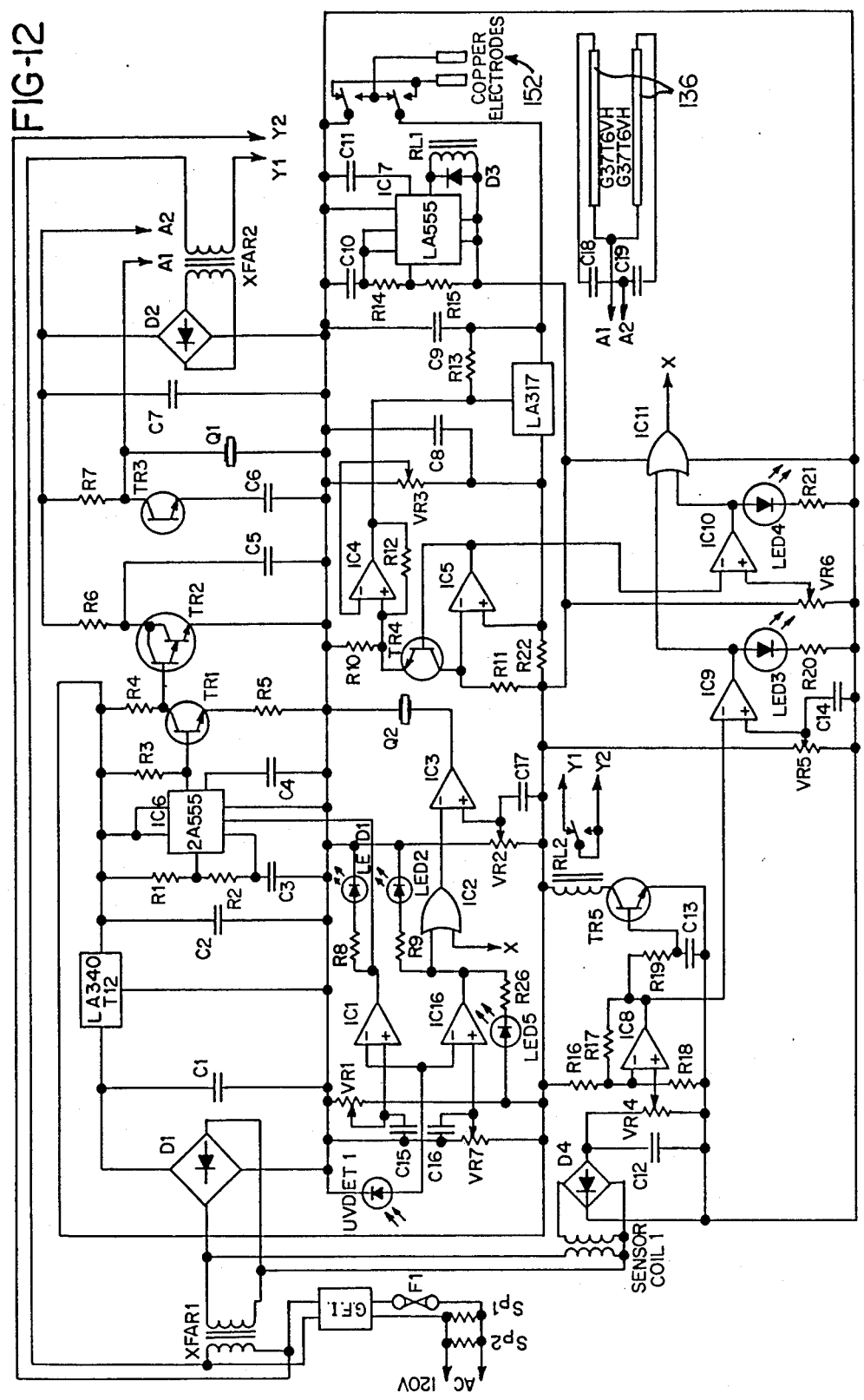
FIG. 12 is a diagram of a modified circuit.

Comparing FIG. 12 to FIG. 11, the major differences between these two circuits are in the lamp drive circuits. The ballast transformer XFMR3 in FIG. 11, is replaced with driving capacitors C18 and C19 in FIG. 12. The lamps 136 are then connected to the output stage of amplifier TR1, TR2 and TR3 via connections A1 and A2. The output of the amplifier consists of a high voltage pulse train between ground potential and the positive high voltage bus of +/−300 volts.

Connecting and driving the lamps in the manner of FIG. 12 benefits the system in several ways, namely:

(1) the surfaces of the lamps become positively charged and thereby tend to repel deposit buildup on the lamps of particles which carry a positive charge;

(2) the current drawn by the lamps is decreased considerably, thus increasing the life of the lamps; and (3) the expensive ballast transformer is eliminated.

Alternative Embodiments

Another embodiment of a water purification device, as disclosed in prior U.S. application Ser. No. 831,772, is illustrated in FIGS. 14 and 15. The device 200 can be substituted into a pool water system in place of the device 14 of FIG. 1.

Device 200 is fabricated of, for the most part, standard plumbing fittings which are compatible with the plastic pipe commonly used in pools and spas, and also in many modern plumbing installations, such as lines from wells. The plastic material, however, must be of a type resistant to UV degradation. The casing of the device includes a hollow pipe 202, a reducer 204 having a 1.5 inch fitting 206 which will fit with standard 1.5 inch pipe. At its other end pipe 202 is fitted through a reducer 208 into a larger tee 210 having a 1.5 inch branch 212 which serves as an outlet. At the other end of the tee there is support structure and a housing, including an internally threaded adapter bush 214, a large adapter 216 which receives a housing pipe 218 and a cap 220 having an electrical connector 222.

Threaded into adapter bush 214 inside the 3 inch tee 210 is a bulkhead 232 which carries a pair of copper electrodes 238, and one set of electrical socket connections 244 for one germicidal ultraviolet tube 246 and one ozone producing ultraviolet tube 248. As shown, the UV tubes 246 and 248 extend substantially the full length of pipe 202. Between them (FIG. 15) is a small plastic conduit 249 which carries electrical wires to the far end, to a support fitting 205 in adapter 204, where the ends of the UV tubes are received and incorporating the other set of electrical socket connections 250.

Bulkhead 232 is sealed to the adapter 214 and incorporates electrical contacts or leads for the copper electrodes 238, probe 240 and the ultraviolet lamps 246, 248, and seals the space within pipe 218 (along with the cap 220). This space provides a convenient housing for the ballast and power supply circuits for the UV tubes, indicated as a circuit board 252, isolated from the surrounding water by conventional rubber seals (not shown). By removing housing 218, the bulkhead 232 can be removed, bringing with it the lamps 246, 248 and electrodes 238.

Figure 16:
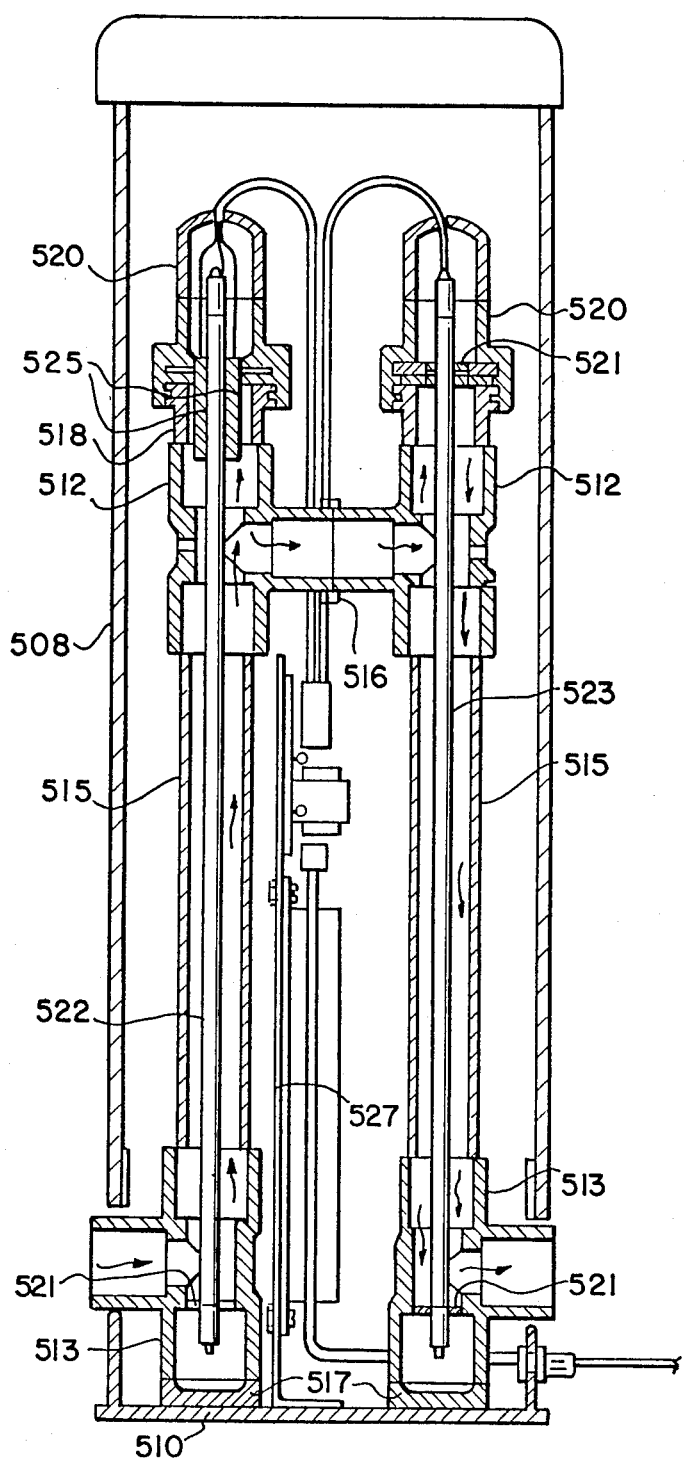
FIG. 16 is a sectional view of another embodiment of a device for treating swimmming pool or spa water in accordance with the present invention.

In a further embodiment of the present invention, also as disclosed in prior U.S. application Ser. No. 831,772, the ultraviolet irradiating device 14 of FIG. 1 is replaced by the treating device 500 shown in FIG. 16. This embodiment is made up of two parallel casings 515, 504 with terminal chambers 506 at opposite ends of the casings, all enclosed allong with the necessary circuits and power supply in a housing 508 which includes a supporting base 510. The casings preferably are constructed of available plastic plumbing parts which can be assembled and chemically welded together in known fashion. Thus FIG. 16 shows each casing to include a pair of tees 512 and 513, one near the top and the other near the bottom of an intermediate tube 515, with the upper tees joined through a ring 516 and the bottoms of the lower tees closed by 517 caps which also rest on base 510.

At the tops of the upper tees there are fittings which include a short length of pipe 518 extending upward and threaded at its upper end, and an elongated cap 520 threaded thereto. In each of the tees there is a flexible (such as rubber) seal or gland 521 which presses against the exterior of the two UV tubes 522, 523 thereby providing isolated chambers which function as terminal boxes for the electrical connections to the ends of the UV tubes. These tubes, of course, will be of the different types previously mentioned, so as to provide the needed ultraviolet radiation and also the required ozone. Also, the plastic components and seal materials are of a type which is resistant to UV degradation.

The water flow path is indicated by arrows, and is generally upward along and around the first UV tube or lamp 522, across the passage formed by the connected upper tees, and downward around the second UV tube 523. If the unit is used for treating recirculating pool or spa water, a pair of spaced copper electrodes 525 can be mounted extending into one of the upper tees, preferably to receive flow moving upward from around the first UV tube 522 as shown in the upper left part of FIG. 16. If the unit is used to treat potable water, the copper electrodes are omitted, and the fittings are the same in both upper tees, as shown on the upper right side in FIG. 16.

A bracket 527 extending upward from base 510 provides a mounting for the circuit board containing the power supply and control circuit for the tubes (as in FIG. 8) and also for the circuit board for the circuit driving the electrodes 525 when it is required. The conventional power connections and electrical sockets to the opposite ends of the UV tubes 522, 523 are simply shown schematically and not numbered. It should be noted, however, that either tube can easily be replaced simply by removing the outer cover 508 and the appropriate upper cap 520, withdrawing the UV tube wherby it will disconnect from its lower socket, inserting a new tube through the glands, and replacing the upper electrical connection and cap.

The terminal box forms, as with the first set of casings, an end wall the second set of casings. At the end of the terminal box, the second set of casings is provided with a removable screw threaded plug 54 similar to that shown in FIG. 3. Along the center of one casing 536 is an ozone producing ultraviolet tube 523. As with the previously described casing, the ozone tube 523 extends through an opening in each of the end walls through which a corresponding end of the ozone tube extends. Where the ozone tube ends extends through the walls there are rubber seals or glands (not shown, but of the type shown in FIG. 9) forming a water tight seal between the ozone tube 523 and the respective end wall very similar to that in the ultraviolet tube 522 of the first housing 515.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. A device for use in purifying a substantial flow of water, comprising:
   ultraviolet lamp means having a generally tubular exterior surface and electrical terminals at each end thereof:
   a generally tubular casing having a longitudinally extending body portion surrounding said lamp means;
   said casing also having an inlet extending from the body portion adjacent one end of said lamp means and an outlet extending from the body portion adjacent the other end of said lamp means,
   at least one end of said lamp means, with the respective terminal, protruding through said casing;
   water-tight removable seals between said casing and said lamp means where lamp means protrudes through said casing,
   said casing and said seals being of material resistant to degradation by UV radiation;
   the interior of said casing and the exterior of said lamp means together defining a flow passage of generally annular cross-section for accomodating a substantial flow of water through said passage from said inlet to said outlet and passing directly over and around said exterior surface of said lamp means;
   ultrasonic tranducer means mounted in said casing to direct ultrasonic energy at said surface of said lamp means to loosen deposited material from said surface for entrainment into the flow of water, whereby said lamp surface is cleaned to minimize attenuation of UV radiation therefrom due to such deposited material; and
   means defining an ionization chamber connected to pass the water flowing through said flow passage and at least one copper element housed in said chamber and presenting a substantial surface to the water flow providing a source of algae controlling copper ions into the water.

2. A device according to claim 1, wherein the copper element consists of a predetermined length of copper wire.

3. A device according to claim 1, wherein the copper elements comprises a pair of spaced electrically insulated copper electrodes extending into said ionization chamber,
means applying a D.C. potential to said electrodes, and
means for regularly reversing the polarity of such applied potential.

4. A device according to claim 1, which further comprises a housing surrounding and protecting the respective end and electrical terminal of said lamp.

5. A device according to claim 4, wherein one end of said casing outside said flow passage is enlarged to form said housing, and lamp driving circuitry for the lamp contained in a watertight housing within the enlarged housing.

6. A device according to claim 1, including power means for driving said lamp means with a D.C. potential in the order of at least 300 V.

7. A device according to claim 6 wherein the power means provides a pulsed D.C. output to said lamp means and a positive charge is created on said exterior surface of said lamp means.

8. A device for treating a body of water, in a swimming pool or spa, which is recirculated in a treatment path external of the pool by a pump, comprising:
a casing operatively connected to said pump and having an inlet and an outlet and a treatment flow path for water flowing between said inlet and outlet; said casing being a stainless steel cylinder having end plates with lamp-receiving apertures therein secured to opposite ends of said cylinder,
an ultraviolet germicidal lamp means having a generally tubular surface positioned in said treatment flow path;
an ozone producing ultraviolet lamp means having a generally tubular surface positioned in said treatment flow path and operative to convert dissolved oxygen in the water into ozone;
said lamp means extending through said apertures and having electrical terminals at the ends thereof located outside said cylinder,
seal means associated with said apertures and including a compressible gland of a material which is resistant to degradation by UV radiation, and
compression means in said seal means compressing said gland against said tubular surface of said lamp means and against the portion of said end plates defining said apertures to support said lamp means sealed to and electrically insulated from said cylinder.
an elongated pipe extending from said inlet and defining the flow path;
a tee fitting having one of its ends connected to said pipe and having its branch extending perpendicular to said pipe and providing said outlet;
means extending from the other end of said tee fitting and providing a chamber,
bulkhead means separating said chamber from the remainder of said tee fitting,
said ultraviolet lamp means extending from said bulkhead toward said inlet in parallel relation to each other,
a pair of copper electrodes positioned spaced apart within the treatment path;
means supported adjacent said casing for powering said ultraviolet lamp means;
means providing a source of electrical power to said powering means and to said electrodes; and
control means limiting the current applied to said electrodes to hold the copper ion concentration in the water within acceptable limits to maintain control of algae growth in the body of water.

9. In a device for use in treating water flowing in a treatment path, the device comprising:
a germicidal ultraviolet lamp having electrical terminals for the supply of electrical energy thereto and having a surface through which UV is radiated;
an ozone producing ultraviolet lamp having electrical terminals for the supply of electrical energy thereto and having a surface through which UV is radiated at a frequency to convert oxygen into ozone;
a casing surrounding said lamps and defining therewith a flow path of annular cross-section for water to be treated, said casing having an extending body portion, an inlet portion including an inlet opening and an outlet portion including an outlet opening such that water to be treated flows along and in direct contact with said surfaces of said lamps;
said casing being constructed of a material resistant to UV degradation;
said flow path within said casing and along the exteriors of said lamps having sufficient capacity to pass at least 10 gallons of water per minute;
a pair of copper electrodes supported in the water flow path through said casing and providing a source of algae controlling copper ions for treating the water to inhibit growth of algae therein;
ultrasonic transducer means mounted in said casing to direct ultrasonic energy at said surfaces of said lamps to loosen deposited material from said surfaces for entrainment into the flow of water, whereby said lamp surfaces are cleaned to minimize impedance of UV radiation therefrom due to such deposited material.

10. The device of claim 9, further comprising
control means providing a constant current electrical source connected to said electrodes to maintain a limited addition of copper ions into the water sufficient to inhibit algae growth.

11. The device of claim 9, further comprising
control means for driving said ultrasonic transducer means periodically during operation of the device to subject said lamp means for short periods of time to the ultrasonic energy.

12. The device of claim 9, further comprising
a UV sensor mounted to receive radiation from said lamp means and connected to said control means to cause driving of said ultrasonic transducer means when UV radiation from said lamp means drops below a predetermined minimum.

13. The device of claim 9, including
means for driving said lamps at a potential of at least 300 V to overcome any cooling which tends to attenuate the UV output of said lamps by the flowing water.

14. A method of treating recirculated water, in a swimming pool, spa or other large volume, which comprises
causing the water to flow in a treatment path through a flow passage which is at least partly defined by a germicidal ultraviolet lamp and an ozone producing ultraviolet lamp such that the water is in direct contact with the lamps and is irradiated by ultraviolet radiation emanating from the germicidal lamp and dissolved oxygen in the water flow is converted into ozone dispersed in the flowing water, directing ultrasonic energy onto the surfaces of the UV lamp means for releasing deposited material from such surfaces;

and in addition causing the water in the treatment path to flow in contact with a predominantly copper element, whereby sufficient ions of the copper are taken up in the water to inhibit growth of algae therein.

15. A method according to claim 14 wherein the copper ions are obtained from a pair of spaced apart copper electrodes across which is applied a reversible polarity direct current potential said electrodes to release copper ions into said water for inhibiting growth of algae in said pool.

16. The method defined in claim 14, including the step of
driving said lamp means at an electrical potential in the order of at least 300 volts to avoid UV output loss due to low lamp surface temperatures.

17. A method of purifying a substantial flow of water from a pool having walls comprising subjecting the flowing water to direct UV irradiation from UV lamp means at a germicidal wavelength of 253.7 nm. and at an ozone creating wavelength of 180 nm. by causing the water to flow over and in direct contact with the surfaces of the lamp means, thereby killing bacteria in the water flow and dispersing ozone for oxidation purposes throughout the water without need for additional mixing;

directing ultrasonic energy onto the surfaces of the UV lamp means for releasing deposited material from such surfaces;

and releasing a controlled amount of algae controlling copper ions into the water sufficient to inhibit algae growth and copper staining on the pool walls.

* * * * *